US009607079B2

(12) United States Patent
Mashimo (10) Patent No.: US 9,607,079 B2
(45) Date of Patent: Mar. 28, 2017

(54) ELECTRONIC DEVICE, DISPLAY METHOD, AND STORAGE MEDIUM

(71) Applicant: CASIO COMPUTER CO., LTD., Shibuya-ku, Tokyo (JP)

(72) Inventor: Yoshinori Mashimo, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 201 days.

(21) Appl. No.: 14/312,047

(22) Filed: Jun. 23, 2014

(65) Prior Publication Data

US 2015/0006513 A1 Jan. 1, 2015

(30) Foreign Application Priority Data

Jun. 27, 2013 (JP) .................................. 2013-135322

(51) Int. Cl.
*G06F 7/00* (2006.01)
*G06F 17/30* (2006.01)
*G06F 17/27* (2006.01)

(52) U.S. Cl.
CPC .... *G06F 17/30696* (2013.01); *G06F 17/2735* (2013.01); *G06F 17/30716* (2013.01)

(58) Field of Classification Search
CPC ............... G06F 17/27; G06F 17/30696; G06F 17/30716; G06F 17/2735
USPC ................. 707/722, 726, 727, 728, 760, 768
See application file for complete search history.

(56) References Cited

U.S. PATENT DOCUMENTS

| 6,032,198 A * | 2/2000 | Fujii ........................ G06F 8/20 717/108 |
| 6,226,638 B1 * | 5/2001 | Okura ................. G06F 17/3064 |
| 6,594,658 B2 * | 7/2003 | Woods ............. G06F 17/30011 |
| 7,194,460 B2 * | 3/2007 | Komamura ........ G06F 17/3064 |
| 8,229,949 B2 * | 7/2012 | Yamasaki ........... G06F 17/3064 707/766 |
| 8,977,554 B1 * | 3/2015 | Hertschuh .......... G06Q 30/0623 704/270 |
| 2008/0222132 A1 * | 9/2008 | Pan ................... G06F 17/30867 |
| 2011/0078179 A1 * | 3/2011 | Unno .................. G06F 17/2735 707/769 |
| 2011/0313997 A1 * | 12/2011 | Chung ............... G06F 17/3089 707/709 |
| 2012/0066575 A1 * | 3/2012 | Abe .................... G06F 17/2735 715/206 |
| 2012/0254209 A1 * | 10/2012 | Ide ................... G06F 17/30696 707/758 |

(Continued)

FOREIGN PATENT DOCUMENTS

JP 2008059392 A 3/2008

*Primary Examiner* — Daniel Kuddus
(74) *Attorney, Agent, or Firm* — Holtz, Holtz & Volek PC (57) ABSTRACT

An electronic device includes a receiving unit, a searching unit, a storing unit, and a displaying unit. The receiving unit receives a search character string. The searching unit searches a dictionary database according to the received search character string. The storing unit stores headwords which are obtained by the searching unit in a memory as search history data. The displaying unit displays a search history graph based on the search history data. Marks are arranged in the search history graph. The marks show positions of headwords searched for in past times, within a range of headwords collected in the dictionary data.

12 Claims, 8 Drawing Sheets

(56) References Cited

U.S. PATENT DOCUMENTS

| | | | |
|---|---|---|---|
| 2013/0080471 A1* | 3/2013 | Forte | G06F 21/6218 707/785 |
| 2013/0204898 A1* | 8/2013 | Satoh | G06F 17/30622 707/780 |
| 2013/0227405 A1* | 8/2013 | Abe | G06F 17/2735 715/259 |

* cited by examiner

ELECTRONIC DEVICE, DISPLAY METHOD, AND STORAGE MEDIUM

CROSS-REFERENCE TO RELATED APPLICATION

This application claims priority based on Japanese Patent Application No. 2013-135322, filed on Jun. 27, 2013, the entire contents of which are incorporated by reference herein.

BACKGROUND OF THE INVENTION

1. Technical Field

The present invention is related to an electronic device having a dictionary function, a display method (and a storage medium).

2. Description of the Related Art

A dictionary is used for learning a foreign language, and a learning method called "dictionary-lookup learning method" using a paper dictionary is performed among students or the like. The term "dictionary-lookup learning method" as used herein refers to a method in which a user attaches a mark such as a tag to a position of a headword obtained by looking up the dictionary, and the number of marks becomes larger as the learning increases, to thereby promote a desire to learn.

On the other hand, an electronic dictionary of the related art may have a history function of accumulating a search history of headwords and displaying a list of words searched for in the past. Also, JP-A-2008-059392 discloses an electronic dictionary device which displays not only a headword list but also headwords searched for in the past and included in a search history among the respective headwords of the list as a history headword list in descending order according to the search frequency when a search character string is input.

In the electronic dictionary of the related art, it is not possible to attach a tag to the position of the headword, and thereby it is not possible to practice the dictionary lookup learning method described above.

The present invention has been accomplished by studying a display at the time of searching a dictionary, in order to provide an electronic device, a display method (and a storage medium thereof) by which it can be expected that a desire to learn will be promoted in a user.

SUMMARY OF THE INVENTION

An electronic device according to the present invention includes a receiving unit, a searching unit, a storing unit, and a displaying unit. The receiving unit receives a search character string. The searching unit searches a dictionary database according to the received search character string. The storing unit stores headwords which are obtained by the searching unit in a memory as search history data. The displaying unit displays a search history graph based on the search history data. Marks are arranged in the search history graph. The marks show positions of headwords searched for in past times, within a range of headwords collected in the dictionary data.

DETAILED DESCRIPTION OF THE PREFERRED EMBODIMENT

Hereinafter, the embodiments of the present invention will be described through the drawings.

Figure 1:
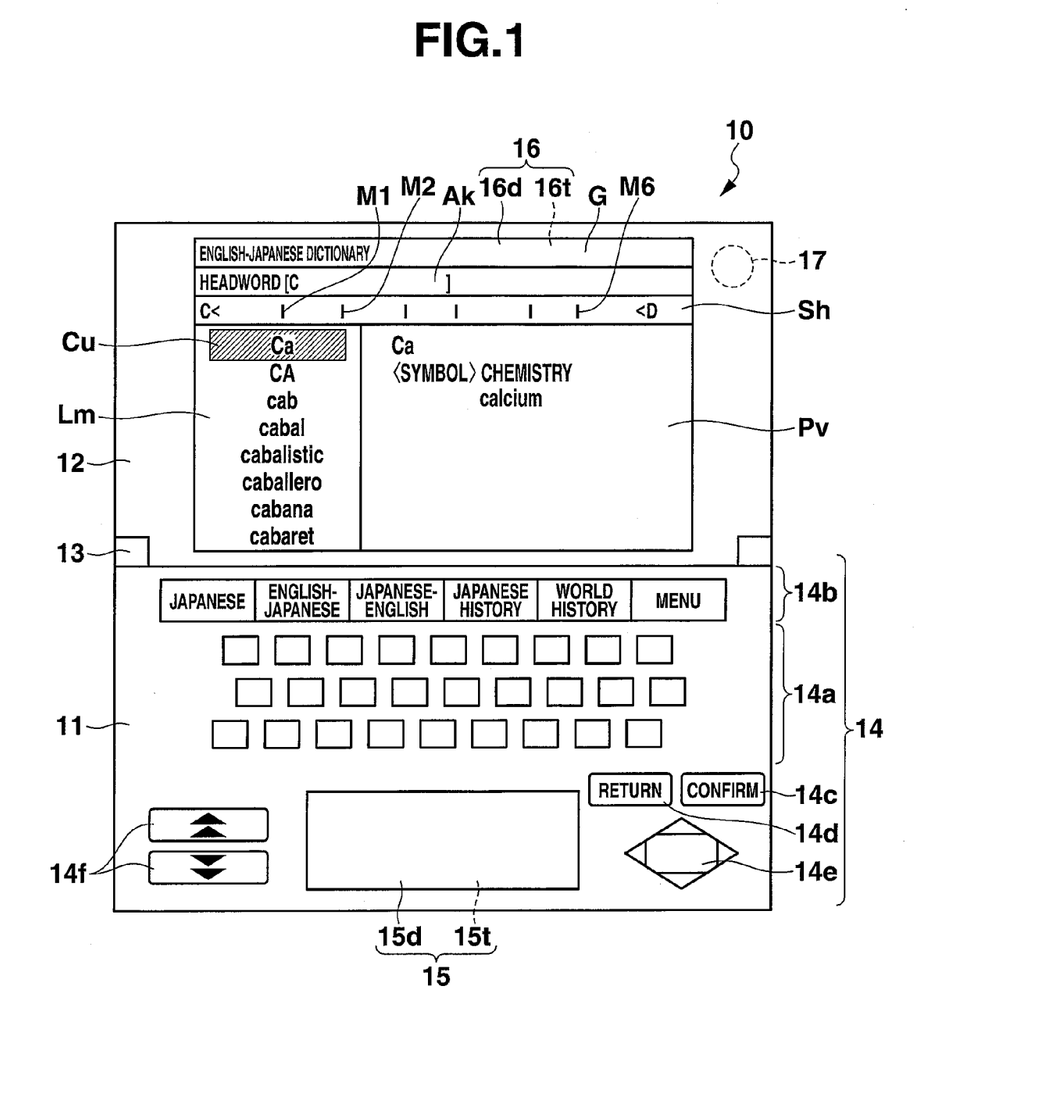
FIG. 1 is an external front view diagram of an electronic dictionary device 10 to which an electronic device having a dictionary function of the present invention is applied.

FIG. 1 is an external front view diagram of an electronic dictionary device 10 according to an embodiment of an electronic device having a dictionary function of the present invention.

The electronic dictionary device 10 is configured as a dedicated portable device for an electronic dictionary described below, or as a touch panel-type personal digital assistants (PDA), a personal computer (PC), a mobile phone, an electronic book, a portable game console, and the like which have a dictionary function.

The electronic dictionary device 10 includes a main body case 11 and a cover case 12 which is openable and closable through a hinge portion 13. On a surface of the main body case 11, a key input unit 14 provided with a character input key 14a, a dictionary designation key 14b, a [confirm] key 14c, a [return] key 14d, a cursor key 14e, a page transmission key 14f, and the like, and a touch panel-type sub-display unit 15 are disposed.

The touch panel-type sub-display unit 15 has a structure in which a touched position detection device for detecting a touched position is integrated with a display device. The sub-display unit 15 is a handwriting character input region for inputting handwriting characters, if required.

Then, the sub-display unit 15 displays a trace according to the handwriting input on a liquid crystal display screen 15d.

In addition, on a surface of the cover case 12, a touch panel-type main display unit 16 of 480×320 dots in which a backlight, for example, is provided with respect to the substantially entire surface is disposed. Further, on a rear surface side of the cover case 12, an imaging unit 17 is disposed.

The touch panel-type main display unit 16 also has a structure in which a touched position detection device for detecting a position touched with a pen or a finger by a user is integrated with a display device, similar to the sub-display unit 15, and a transparent touch panel 16t is disposed on a color liquid crystal display screen 16d provided with a backlight in an overlapping manner.

Furthermore, the electronic dictionary device 10 has a graph creation function of displaying a search history graph Sh in which positions of respective headwords registered as a search history within the selected dictionary are shown by line-shaped marks M1, M2, . . . , Mn on an upper portion of a headword search screen G. In addition, the electronic dictionary device 10 has a mark corresponding headword description display function of displaying description information of the headword corresponding to the mark Mn when the mark Mn of the search history graph Sh is touched by the user.

Furthermore, when the characters of the search word are input, the graph creation function re-creates and displays the search history graph Sh with respect to the range of the dictionary in which the headwords which can be right-truncated to the input character string exist.

Figure 2:
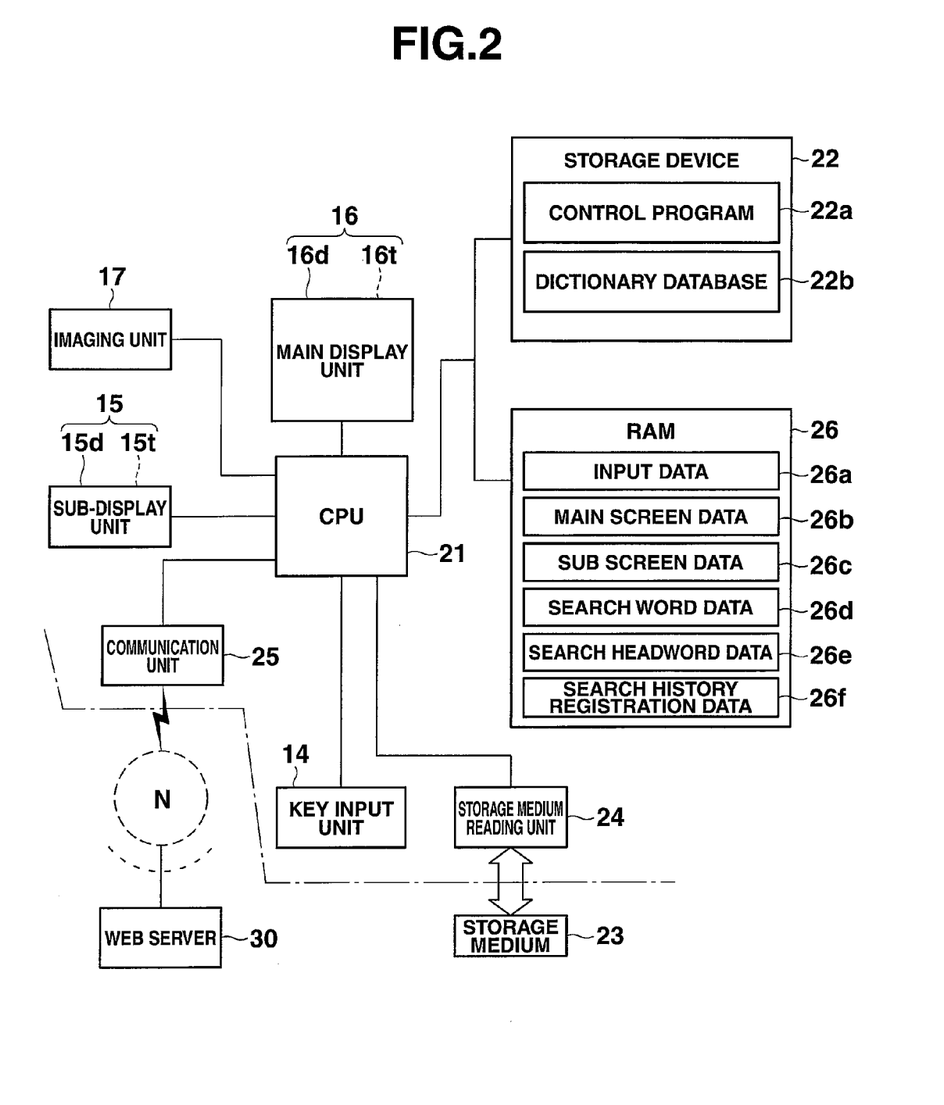
FIG. 2 is a block diagram illustrating a configuration of an electronic circuit of the electronic dictionary device 10.

FIG. 2 is a block diagram illustrating a configuration of an electronic circuit of the electronic dictionary device 10.

The electronic dictionary device 10 is configured by a computer which reads in programs recorded in various storage media to control the operations by instructions included in the read programs, and provided with a CPU (central processing unit) 21 on the electronic circuit.

The CPU 21 performs various operations by executing a device control program 22a stored in a storage device 22 in advance, by using a RAM 26 as a work memory. The device control program 22a may be read into the storage device 22 through a storage medium reading unit 24 from an external storage medium 23 such as a ROM card, or read into the storage device 22 through a communication unit 25 from a Web server (in this case, a program server) 30 on the Internet N.

The device control program 22a stored in the storage device 22 is launched according to an input signal according to a user operation from the key input unit 14, the touch panel-type sub-display unit 15, and the touch panel-type main display unit 16, an imaging signal according to the user operation from the imaging unit 17, or a communication signal of each of the Web servers 30 . . . on the Internet N which are connected through the communication unit 25.

Thus, the CPU 21 is connected with the storage device 22, the storage medium reading unit 24, the communication unit 25, the RAM 26, the key input unit 14, the touch panel-type sub-display unit 15, the touch panel-type main display unit 16, and the imaging unit 17.

The storage device 22 stores a system program for controlling the entire operations of the electronic dictionary device 10 as the device control program 22a. The device control program 22a includes a dictionary search program for controlling a search word input process, a dictionary search process, a creation process of a search history graph Sh based on search history information, a description information display process of the headwords corresponding to the marks Mn of the search history graph Sh, or the like.

In a dictionary database 22b, various types of dictionary data items, for example, a [Japanese dictionary], an [English-Japanese dictionary], a [Japanese-English dictionary], an [encyclopedia], and the like are stored in advance, or stored by downloading.

The RAM 26 is provided with an input data memory 26a, a main screen data memory 26b, a sub screen data memory 26c, a search word data memory 26d, a search headword data memory 26e, a search history registration data memory 26f, and the like.

The input data memory 26a sequentially stores individual input data items according to the user operation of the key input unit 14, and the touch panels 15t and 16t.

The main screen data memory 26b stores display data to be displayed on the touch panel-type main display unit 16.

The sub screen data memory 26c stores display data to be displayed on the touch panel-type sub-display unit 15.

The search word data memory 26d stores a character string of the search word input by the user.

The search headword data memory 26e stores the headwords which can be right-truncated to the search word stored in the search word data memory 26d by abstracting from the dictionary data selected as a search target.

In the search history registration data memory 26f, when the description information of the headword searched for in the dictionary is displayed, the overall position of the headword within the entire dictionary is calculated, and the same headword is accumulated along with information of the overall position thereof.

In the electronic dictionary device 10 configured as described above, the CPU 21 controls the operations of respective circuit units according to the instruction described in the device control program 22a, and software and hardware operate in cooperation with each other, thereby realizing a function to be described in the operational description below.

Next, the operation of the electronic dictionary device 10 according to the configuration will be described on the basis of an example of searching in the English-Japanese dictionary.

First Embodiment

Figure 3:
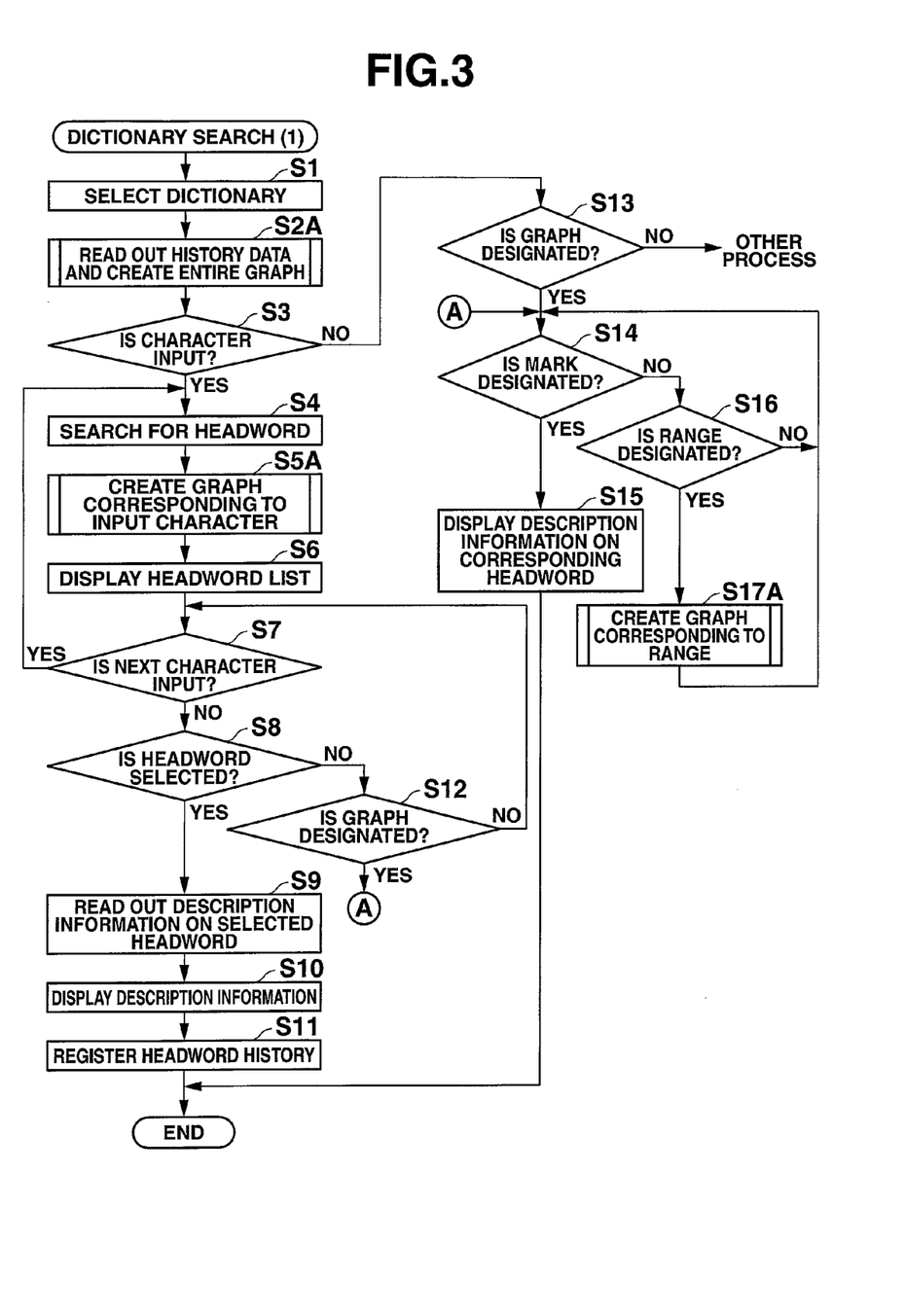
FIG. 3 is a flowchart illustrating a dictionary search process (1) according to a first embodiment.

FIG. 3 is a flowchart illustrating a dictionary search process (1) according to a first embodiment of the electronic dictionary device 10.

Figure 4:
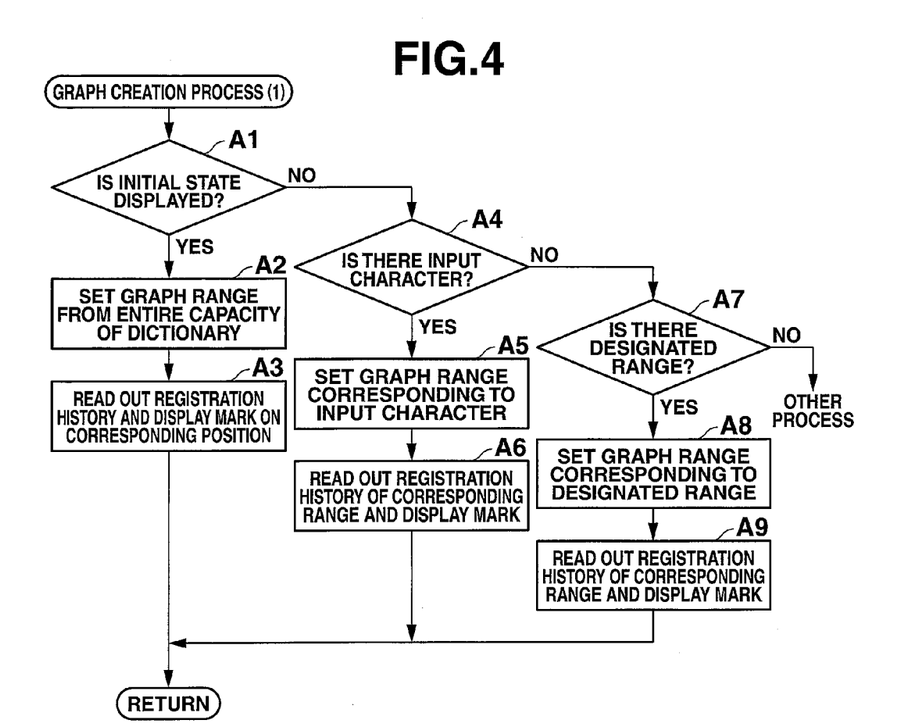
FIG. 4 is a flowchart illustrating a graph creation process (1) according to the first embodiment.

FIG. 4 is a flowchart illustrating a graph creation process (1) in the dictionary search process (1).

Figure 5:
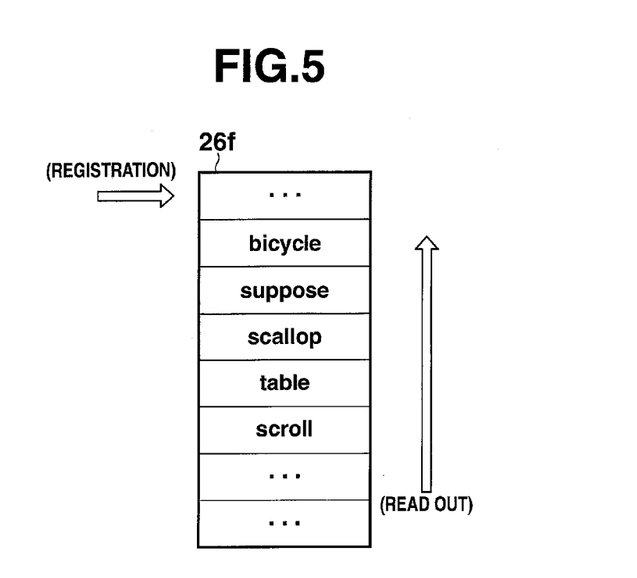
FIG. 5 is a diagram illustrating a search history registration data memory 26f of the electronic dictionary device 10.

FIG. 5 is a diagram illustrating a search history registration data memory 26f of the electronic dictionary device 10.

FIGS. 6A to 6E are diagrams illustrating specific examples of a display operation in the dictionary search process.

When the [English-Japanese dictionary] is selected by the dictionary designation key 14b, the dictionary search screen G (refer to FIG. 6A) of the [English-Japanese dictionary] is displayed on the main display unit 16 (Step S1). Next, the process proceeds to the graph creation process (1) (Step S2A). The graph creation process (1) will be described by the flowchart of FIG. 4.

In the graph creation process (1), first, it is determined whether or not the display is an initial display immediately after selecting the dictionary (Step A1). Here, since it is determined that the display is the initial display (Step A1 (Yes)), the entire capacity of the selected dictionary is set as a range of a graph to be created (Step A2).

Figure 6A:
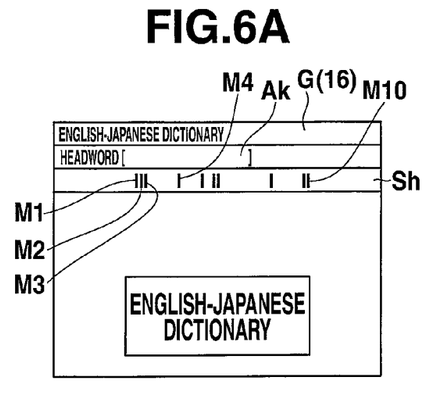
FIGS. 6A to 6E are diagrams illustrating specific examples of a display operation in the dictionary search process according to the first embodiment.

Then, the respective headwords searched for in the past and the positional information thereof within the dictionary which are stored in the search history registration data memory 26f (refer to FIG. 5) are read out, and, as illustrated in FIG. 6A, a search history graph Sh in which the marks M1, M2, . . . , M10 showing the positions of the respective headwords within the entire dictionary are arranged is created and displayed (Step A3).

Figure 6B:
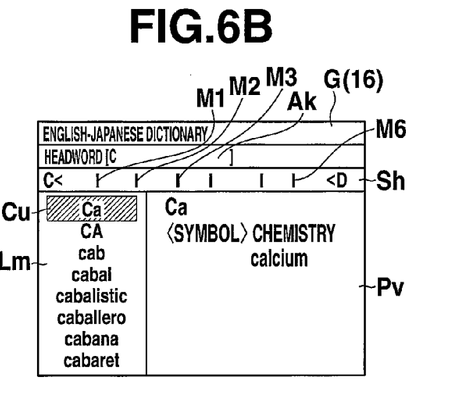

In the initial display state of the dictionary search screen G in which the search history graph Sh is displayed, as illustrated in FIG. 6B, when an initial character "C" of the headword desired to be searched for is input into a search word input area Ak (Step S3 (Yes)), the input character is received by the CPU 21, and the headwords which can be right-truncated to the character "C" are searched for in the [English-Japanese dictionary] (Step S4).

Then, the process proceeds again to the graph creation process (1) illustrated in FIG. 4, and a re-display process of the search history graph Sh is performed (Step S5A).

In the graph creation process (1), since it is determined that the character "C" is input (Step A4 (Yes)), within the entire capacity of the dictionary, the capacity between the input character "C" and the next character "D" is set as the range of the graph (Step A5). That is, in this case, all headwords beginning with "C" are set as the range.

Then, in the set range between the headword characters "C" and "D" of the dictionary, the respective headwords searched for in the past and the positional information thereof which are stored in the search history registration data memory 26f (refer to FIG. 5) are read out, and a search history graph Sh in which the marks M1, M2, . . . , M6 showing the positions of the respective headwords within the head range of "C" to "D" of the dictionary are arranged is re-created and displayed (Step A6).

Next, a list of the respective headwords which can be right-truncated to the search character "C" searched for in the [English-Japanese dictionary] in Step S4 is displayed on the headword list area Lm (Step S6). At this time, a cursor Cu is located on the leading headword "Ca", and the description information is displayed on a preview area Pv.

Then, further, when the next character "a" is additionally input (Step S7 (Yes)), the additional input is received, and the headwords which can be right-truncated to the character string including this character are searched for (Step S4). Then, the process proceeds to Step S5A, the processes are performed similar to the previous processes, and a search history graph Sh corresponding to the narrowed range between the character string "CA" and the next headword characters "CB" (the range of all headwords beginning with "CA") is re-created and displayed. Thus, when a search character is added, the processes of Steps S4 to S6 are repeated, and the search history graph with the narrowed range is displayed along with the headword list.

Then, when any headword of the headword list displayed on the headword list area Lm is selected (Step S8 (Yes)), the description information of the selected headword is read out from the [English-Japanese dictionary] (Step S9), and opened and displayed on the substantially entire screen of the main display unit 16 as a description information display screen Ge (Step S10).

Then, the selected headword and the positional information thereof within the dictionary are additionally registered and accumulated in the search history registration data memory 26f (refer to FIG. 5) (Step S11).

On the other hand, when it is determined that the search history graph Sh is designated by a touch, in the display state illustrated in FIG. 6B (Step S12 (Yes)), or when it is determined that the search history graph Sh is designated by a touch, in the initial display state of the dictionary search screen G illustrated in FIG. 6A (Step S13 (Yes)), the process proceeds to the processes after Step S14.

Figure 6C:
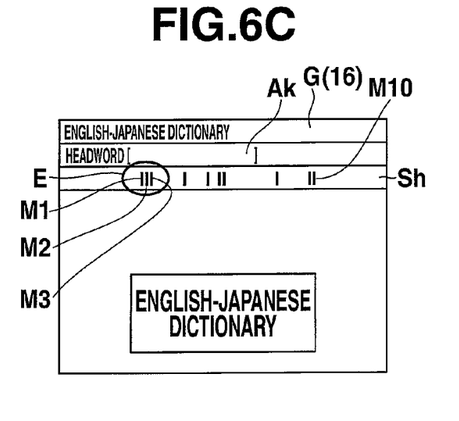

That is, as illustrated in FIG. 6C, when it is determined that a certain range of the search history graph Sh, for example, a range E in which the marks M1, M2, and M3 are displayed, is designated by surrounding with a pen, in the initial display state of the dictionary search screen G (Steps S13, S16 (Yes)), the range designation is received by the CPU 21, and the process proceeds again to the graph creation process (1) of FIG. 4 (Step S17A).

In the graph creation process (1), since it is determined that the range is designated in the search history graph Sh (Step A7 (Yes)), the capacity of the dictionary of a portion corresponding to the designated range is set as a range of a graph to be created (Step A8).

Figure 6D:
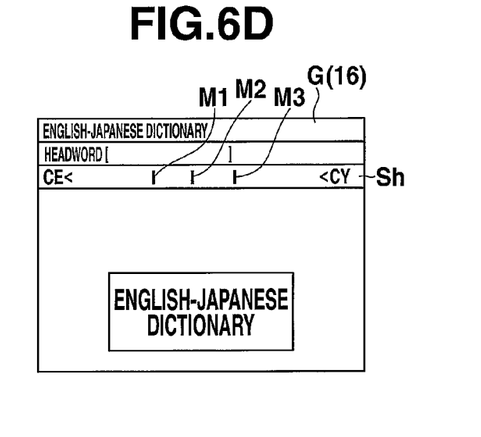

Then, in the set range of the dictionary (for example, the range of the headword characters "CE" to "CY"), the respective headwords searched for in the past and the positional information thereof which are stored in the search history registration data memory 26f (refer to FIG. 5) (here, the respective headwords and the positional information thereof corresponding to the marks M1, M2, and M3) are read out, and a search history graph Sh is re-created and displayed as illustrated in FIG. 6D (Step A9).

Furthermore, in Steps S2A, S5A, and S17A of the graph creation process (1), when being read out from the search history registration data memory 26f, the headwords and the positional information thereof within the set range are sequentially read out from the headwords registered in the past, as illustrated in FIG. 5. Therefore, the display color of each of the marks Mn becomes paler as the searched headword registered earlier and it is possible to readily notify the user of the elapsed time after the registration thereof.

On the other hand, when an arbitrary mark Mn of the search history graph Sh illustrated in FIGS. 6A to 6D is designated by the user, it is determined that the mark is designated (Step S14 (Yes)), the headword stored in the search history registration data memory 26f along with the positional information corresponding to the designated mark Mn is specified, the description information of the headword is read out from the [English-Japanese dictionary], and a description information display screen Ge is created and displayed on the main display unit 16 (Step S15).

Figure 6E:
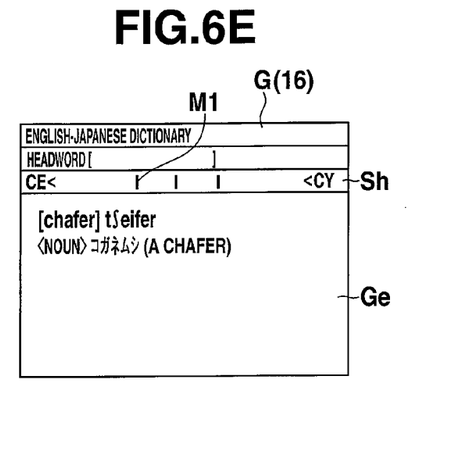

In detail, as illustrated in FIG. 6D, in the dictionary search screen G on which the search history graph Sh corresponding to the range of the headword characters "CE" to "CY" is displayed, when it is determined that the mark M1 is designated (Step S14 (Yes)), the description information of the headword [chafer] stored in the search history registration data memory 26f along with the positional information corresponding to the mark M1 is read out, and a description information display screen Ge is created and displayed on the main display unit 16 as illustrated in FIG. 6E (Step S15).

Therefore, in the dictionary search function according to the first embodiment, when the dictionary search is performed, the searched headword is stored and accumulated in the search history registration data memory 26f along with the information of the overall position thereof within the dictionary data. Then, on the basis of the positional information of the respective headwords within the dictionary which is stored in the search history registration data memory 26f, a search history graph Sh in which the marks Mn . . . showing the positions of the respective headwords with respect to the range of the dictionary data are arranged is created and displayed on the dictionary search screen G. When the mark Mn displayed on the search history graph Sh is designated according to the user operation, the headword and the description information thereof corresponding to the designated mark Mn are read out, and displayed as the description information display screen Ge.

According to the electronic dictionary device described above, at the time of searching the dictionary, since the search condition in the past is shown by the graph in which the number of marks attached to the graph becomes larger as the usage of the dictionary increases, it is possible to use the dictionary lookup learning method of the paper dictionary, and it can be expected that a desire to learn will be promoted in the user.

Second Embodiment

Figure 7:
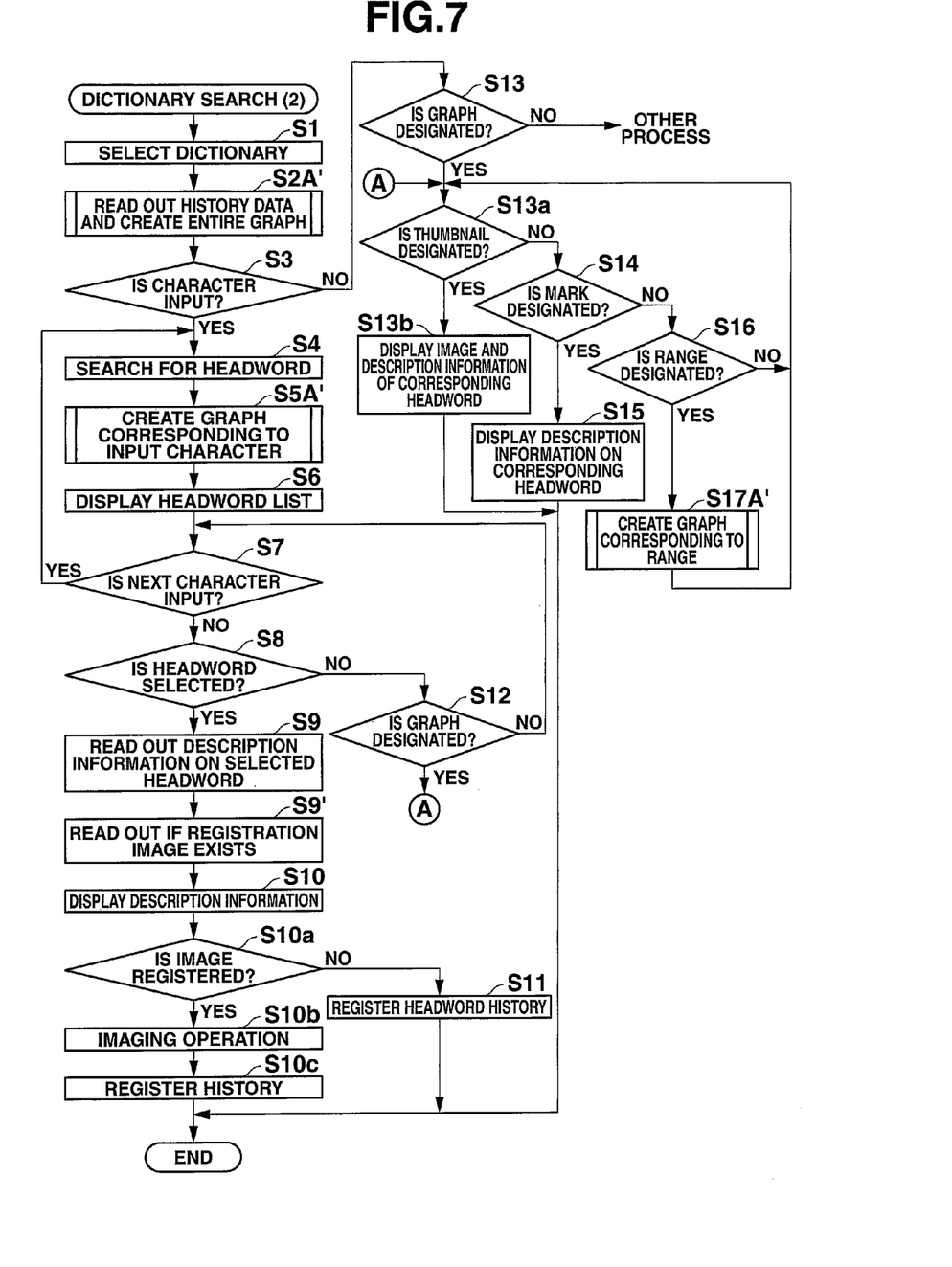
FIG. 7 is a flowchart illustrating a dictionary search process (2) according to a second embodiment.

FIG. 7 is a flowchart illustrating a dictionary search process (2) according to a second embodiment of the electronic dictionary device 10.

Figure 8:
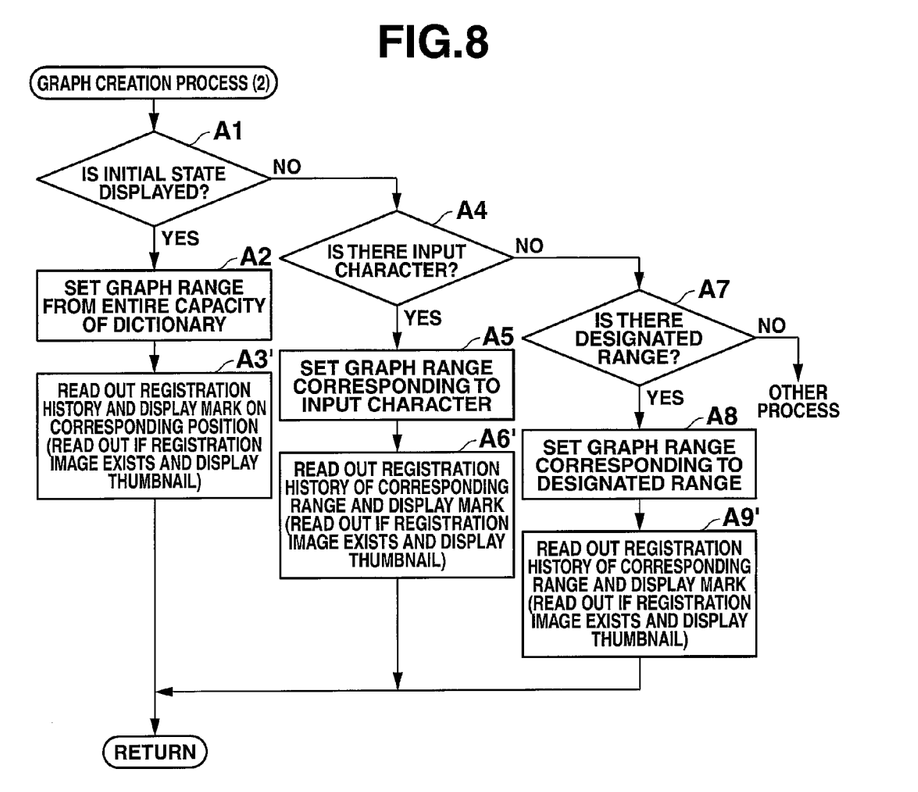
FIG. 8 is a flowchart illustrating a graph creation process (2) according to the second embodiment.

FIG. 8 is a flowchart illustrating a graph creation process (2) according to the second embodiment.

Figure 9:
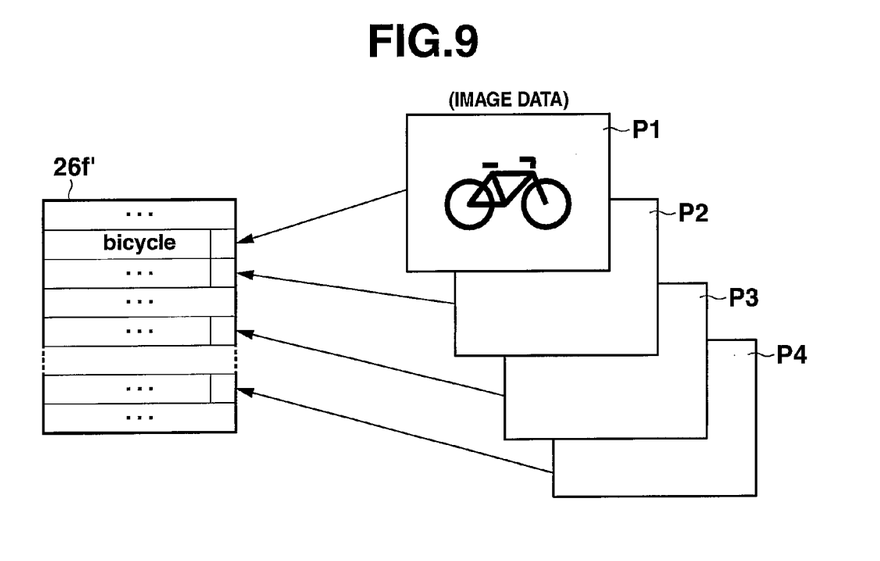
FIG. 9 is a diagram illustrating a search history registration data memory 26f' according to the second embodiment.

FIG. 9 is a diagram illustrating a search history registration data memory 26f' according to the second embodiment.

Figure 10:
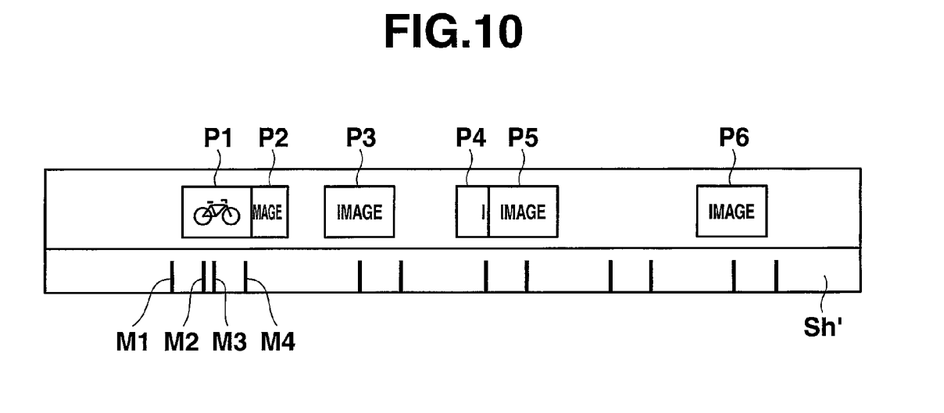
FIG. 10 is a diagram illustrating a search history graph Sh' created through the graph creation process (2) according to the second embodiment.

FIG. 10 is a diagram illustrating a search history graph Sh' created through the graph creation process (2) according to the second embodiment.

Figure 11:
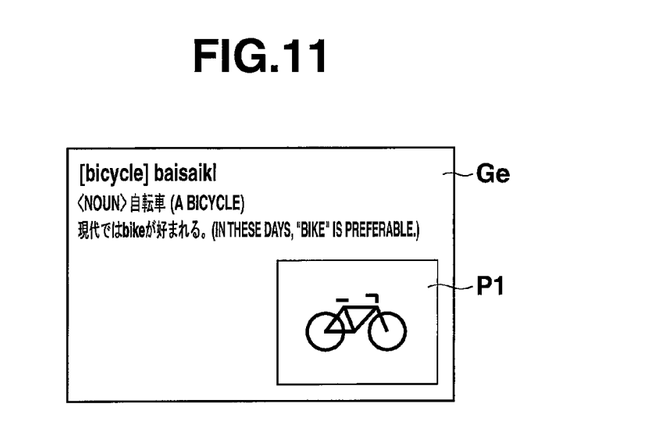
FIG. 11 is a diagram illustrating a description information display screen Ge displayed through the dictionary search process (2) according to the second embodiment.

FIG. 11 is a diagram illustrating a description information display screen Ge displayed through the dictionary search process (2) according to the second embodiment.

In the dictionary search process (2) and the graph creation process (2) according to the second embodiment, the same step numerals are applied with respect to the same process steps as those of the dictionary search process (1) and the graph creation process (1) according to the first embodiment, and the description thereof will be omitted.

In the dictionary search process (2) according to the second embodiment, when the dictionary search for the input search character is performed and the description information of the headword is displayed (Step S10), a message for inquiring of the user whether to attach a shot image or not in the case of registering the headword as the search history is output (not illustrated). Meanwhile, when the user selects to register the headword with the image (Step S10a (Yes)), an arbitrary image is shot by the imaging unit 17 (Step S10b). For example, the process is performed when "bicycle" is searched for in the dictionary and the picture is attached to the dictionary. When being shot, as illustrated in FIG. 9, the shot image Pn is stored in the search history registration data memory 26f' in association with the headword and the positional information thereof within the dictionary (Step S10c). Furthermore, information of the shooting date and time may be added to data of the shot image Pn.

On the other hand, when the dictionary search is performed, the desired headword is selected among the list of the respective headwords displayed on the headword list area Lm (Steps S6 to S8), and the description information corresponding to the selected headword is read out from the dictionary (Step S9). Next, when the image Pn is stored in the search history registration data memory 26f' (refer to FIG. 9) in association with the headword, the image Pn is read out (Step S9'). When the data is read out, as illustrated in FIG. 11, the image Pn is displayed along with the description information corresponding to the selected headword (Step S10).

Thus, the user takes a picture of a sentence of a page of a book in which the word to be searched for is described, a signboard, a Web image, or the like, or an object indicated by the word at the time of searching the dictionary to store in the search history registration data memory 26f'. Then, when the user searches for the headword next time, it is possible to concurrently display the shot image at the time of displaying the description information. Accordingly, it is possible to notice the condition in which the same headword was searched for, thereby pleasantly promoting the desire to learn for the language learning.

In addition, in any case of the graph creation process (Step S2A', Step S5A', and Step 517A') of the graph creation process (2) according to the second embodiment, the headword, the positional information thereof, and the images P1, P2, . . . are read out from the search history registration data memory 26f' (refer to FIG. 9) corresponding to the set graph range, and, as illustrated in FIG. 10, a search history graph Sh' in which the marks M1, M2, . . . showing the positions of the respective headwords are arranged and the thumbnails P1, P2, . . . of the images are added on the marks is created and displayed (Steps A3', A6', and A9').

Here, since the data stored in the search history registration data memory 26f' is read out in chronological order, similar to the first embodiment (refer to FIG. 5), the image thumbnails Pn, . . . corresponding to the respective headwords of the search history graph SW (refer to FIG. 10) created as a result, are sequentially displayed such that the thumbnail image Pn registered in the past is first displayed and then the next registered thumbnail image Pm is overwritten.

Thus, by just watching the search history graph SW displayed on the dictionary search screen G, it is not only possible to easily recognize the positions of the headwords searched for in the past within the dictionary data corresponding to the range of the graph, according to the marks M1, M2, . . . , but also possible to remember or be reminded of the condition in which the headword was searched for, according to the thumbnails P1, P2, . . . added to the marks M1, M2, . . . .

Then, in the search history graph Sh' (refer to FIG. 10), for example, when it is determined that the thumbnail P1 is designated (Step S13a (Yes)), the description information of the headword [bicycle] stored in the search history registration data memory 26f' in association with the image of the designated thumbnail P1 is read out, and as illustrated in FIG. 11, displayed on the main display unit 16 along with the image P1 as the description information display screen Ge (Step S13b).

Therefore, in the dictionary search function according to the second embodiment, since the image shot at the time of searching the dictionary is stored in association with the headword stored in the search history registration data memory 26f', when a search history graph Sh' is created and displayed, it is possible to additionally display the thumbnails P1, P2, . . . of the image along with the marks M1, M2, . . . showing the positions of the headwords.

For this reason, similar to the first embodiment, it is possible to use the dictionary lookup learning method of the paper dictionary by using the search history graph Sh', and the user can expect to promote the desire to learn.

Furthermore, the respective processing methods and the database of the electronic dictionary device 10 described in the respective embodiments, that is, the respective methods such as the dictionary search process (1) of the first embodiment illustrated in the flowcharts of FIG. 3 and FIG. 4, the dictionary search process (2) of the second embodiment illustrated in the flowcharts of FIG. 7 and FIG. 8, and the database including the dictionary database 22b and the like, can be distributed by storing in an external storage medium 23 such as a memory card (a ROM card, a RAM card, or the like), a magnetic disk (a floppy disk, a hard disk, or the like), an optical disc (a CD-ROM, a DVD, or the like), and a semiconductor memory, as a program able to be executed by any computer.

Furthermore, the respective embodiments of the electronic device having the dictionary function are described such that the entire operations of the dictionary search process is performed in the dedicated device which is the electronic dictionary device 10, but the electronic device having the dictionary function may be configured as a server device of a cloud system.

That is, in this case, by being supplied with an arbitrary dictionary selecting instruction by the user from a terminal device such as a tablet terminal having the dictionary database 22b and an user interface, the server device creates a dictionary search screen G corresponding to the selected dictionary and outputs the display data to the terminal device to display the data. In addition, by being supplied with an arbitrary search word by the user according to the dictionary search screen G from the terminal device, the server device searches for the headword according to the character (string) of the search word, creates a description information display screen Ge corresponding to the headword, and outputs the display data to the terminal device to display the data. At this time, the searched headword is registered along with the positional information thereof within the dictionary as a search history (26f). In addition, the dictionary search screen G is created in combination with the search history graph Sh created by arranging the marks M1, M2, . . . showing the positions of the respective headwords within the dictionary which are registered as the search history (26f). Then, by being supplied with the content with respect to an arbitrary mark Mn designated by the user which is arranged in the search history graph Sh on the dictionary search screen G from the terminal device, the server device creates a description information display screen Ge in which the description information of the searched headword corresponding to the designated mark Mn is read out and opened from the selected dictionary, and outputs the display data to the terminal device to display the data.

Furthermore, when the system includes the terminal device and the server device, each means of a memory for storing the dictionary data, means for searching, a memory for storing the search history, and means for creating a search history graph may be provided in the terminal device or the server device, by arbitrarily selecting any one of the terminal device and the server device according to the dictionary search system.

Accordingly, even in the terminal device having no particular function, it is possible to search for the headword corresponding to the search word input by the user and to display the display screen Ge of the description information by accessing the server device, and it is also possible to confirm the positions of the headwords searched for in the past within the dictionary according to the marks M1, M2, . . . or to display the description information display screen Ge of the searched headword corresponding to the mark Mn by designating the mark Mn by using the search history graph Sh.

The present invention is not limited to the respective embodiments, and may be variously changed within the scope not departing from the gist in the steps of the embodiments. Further, the inventions in various steps are included in the respective embodiments, and the various inventions can be abstracted by suitably combining a plurality of configuration requisites described herein. For example, even if some configuration requisites are deleted from the entire configuration requisites disclosed in the respective embodiments, or some configuration requisites are combined as a different form, it is possible to solve the problem described in [Problem that the Invention is to Solve], thereby abstracting the configuration in which the configuration requisites are deleted or combined when it is possible to obtain the effect described herein.

What is claimed is:

1. An electronic device comprising:
a processor that performs processes of:
receiving a search character string;
searching a dictionary database according to the received search character string;
storing headwords which are retrieved by searching dictionary data of the dictionary database in a memory as search history data; and
displaying, based on the search history data, a search history graph having a narrow range along a direction in which marks are arranged at different positions from each other along the direction, each of the marks on the search history graph showing a relative position of a respective one of the headwords which are stored in the memory as at least a part of an entirety of a search history within a range of an entirety of headwords collected in the dictionary data;
wherein the process of displaying the search history graph by the processor, when receiving the search character string, and before displaying the search history graph, narrows a range of the headwords, wherein headwords that are right-truncated to the received search character string are retrieved from among the entirety of the headwords collected in the dictionary data.

2. The electronic device according to claim 1, further comprising:
a dictionary database storing unit which stores the dictionary data in which a plurality of headwords are collected,
wherein the process of searching the dictionary database by the processor searches for the headwords from the stored dictionary data.

3. The electronic device according to claim 2, wherein:
the processor further performs a process of acquiring image data, and storing the acquired image data in association with the searched headwords, and
the process of displaying the search history graph adds a thumbnail image corresponding to the stored image data at a periphery of the marks in accordance with the marks.

4. The electronic device according to claim 1, wherein the processor further performs processes of:
receiving designation of a range specified by a user in the search history graph displayed on the display device;
modifying the positions of the marks on the search history graph, each of the modified positions of the marks on the search history graph showing a modified relative position of each of the headwords stored in the memory as at least a part of an entirety of the search history data within the designated range, the at least the part of the entirety of the search history data corresponding to the designated range; and
redisplaying the search history graph in which the positions of the marks are modified.

5. A display method of an electronic device having a dictionary function, the method comprising steps of:
receiving a search character string;
searching a dictionary database according to the received search character string;
storing headwords which are retrieved by searching dictionary data of the dictionary database in a memory as search history data; and
displaying, based on the search history data, a search history graph having a narrow range along a direction in which marks are arranged at different positions from each other along the direction, each of the marks on the search history graph showing a relative position of a respective one of the headwords which are stored in the memory as at least a part of an entirety of a search history within a range of an entirety of headwords collected in the dictionary data;

wherein the step of displaying the search history graph, when receiving the search character string, and before displaying the search history graph, narrows a range of the headwords, wherein that headwords that are right-truncated to the received search character string are retrieved from among the entirety of the headwords collected in the dictionary data.

6. The display method according to claim 5, wherein:
the electronic device includes a dictionary database storing unit which stores the dictionary data in which a plurality of headwords are collected, and
the step of searching the dictionary database searches for the headwords from the dictionary data stored in the dictionary database storing unit.

7. The display method according to claim 6, further comprising a step of acquiring image data and storing the acquired image data in association with the searched headwords,
wherein the step of displaying the search history graph adds a thumbnail image corresponding to the stored image data at a periphery of the marks in accordance with the marks.

8. The display method according to claim 5, further comprising steps of:
receiving designation of a range specified by a user in the search history graph displayed on the display device;
modifying the positions of the marks on the search history graph, each of the modified positions of marks on the search history graph showing a modified relative position of each of the headwords stored in the memory as at least a part of an entirety of the search history data within the designated range, the at least the part of the entirety of the search history data corresponding to the designated range; and
redisplaying the search history graph in which the positions of the marks are modified.

9. A non-transitory computer readable storage medium having stored therein instructions which, when executed by a device, control the device to:
receive a search character string;
search a dictionary database according to the received search character string;
store headwords which are retrieved by searching dictionary data of the dictionary database in a memory as search history data; and display, based on the search history data, a search history graph having a narrow range along a direction in which marks are arranged at different positions from each other along the direction, each of the marks on the search history graph showing a relative position of a respective one of the headwords which are stored in the memory as at least a part of an entirety of a search history within a range of an entirety of headwords collected in the dictionary data;

wherein the instruction which controls the device to display the search history graph controls the device to, when receiving the search character string, and before displaying the search history graph, narrow a range of the headwords, wherein headwords that are right-truncated to the received search character string are retrieved from among the entirety of the headwords collected in the dictionary data.

10. The storage medium according to claim 9, wherein:
the device includes a dictionary database storing unit which stores the dictionary data in which a plurality of headwords are collected, and
the instruction which controls the device to search the dictionary database controls the device to search for the headwords from the dictionary data stored in the dictionary database storing unit.

11. The storage medium according to claim 10, further comprising an instruction which controls the device to acquire image data and store the acquired image data in association with the searched headwords, and
wherein the instruction which controls the device to display the search history graph controls the device to add a thumbnail image corresponding to the stored image data at a periphery of the marks in accordance with the marks.

12. The storage medium according to claim 9, further comprising instructions which control the device to:
receive designation of a range by a user in the search history graph displayed on the display device;
modify the positions of marks on the search history graph, each of the modified positions of the marks on the search history graph showing a modified relative position of each of the headwords stored in the memory as at least a part of an entirety of the search history data within the designated range, the at least the part of the entirety of the search history data corresponding to the designated range; and
redisplay the search history graph in which the positions of the marks are modified.

* * * * *